L. WRIGHT.
Sorghum Evaporator.
No. 44,135.  Patented Sept. 6, 1864.
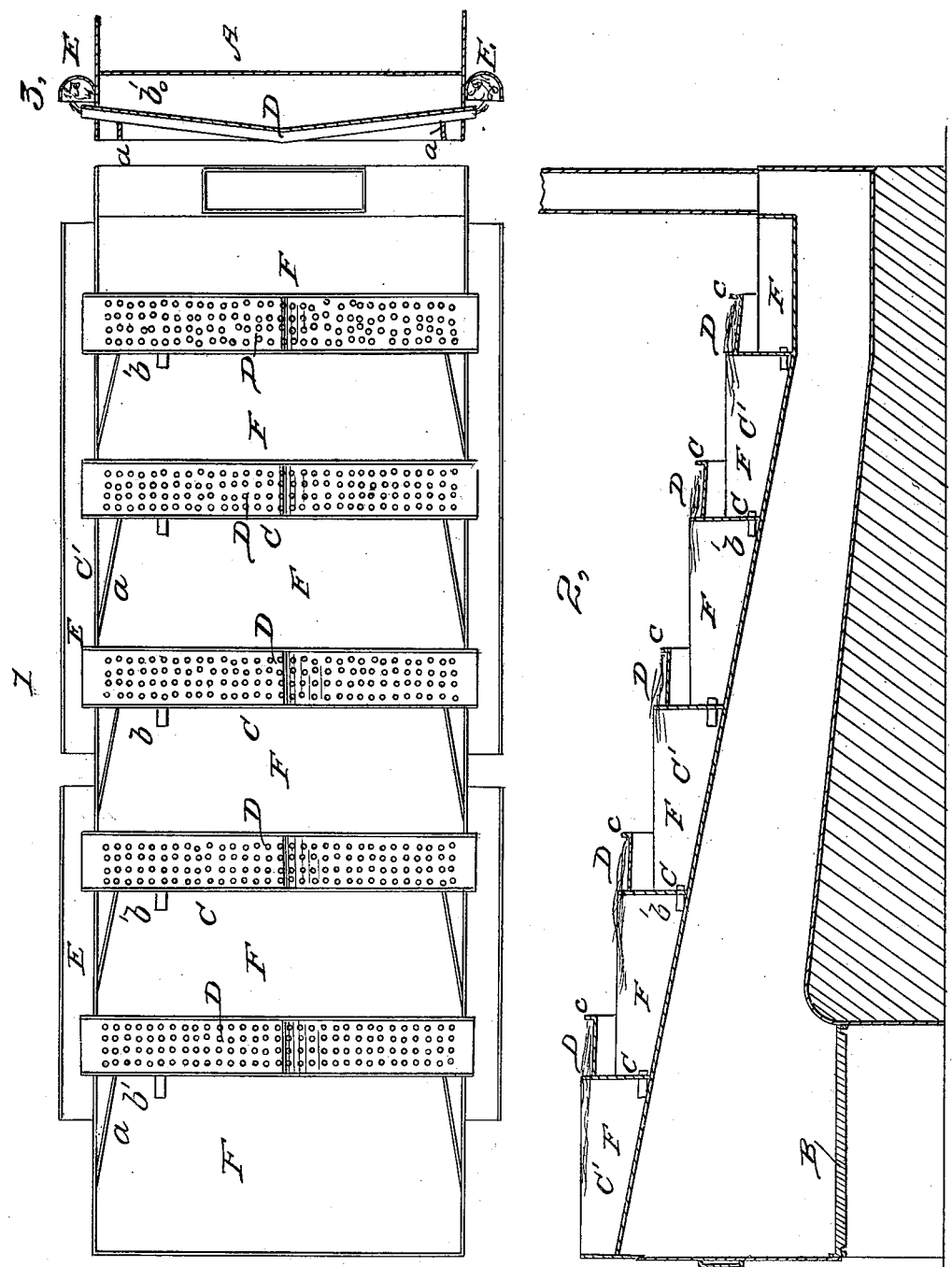

UNITED STATES PATENT OFFICE.

LEVI WRIGHT, OF WAPELLA, ILLINOIS.

IMPROVED SORGHUM-EVAPORATOR.

Specification forming part of Letters Patent No. 44,135, dated September 6, 1864.

*To all whom it may concern:*

Be it known that I, LEVI WRIGHT, of Wapella, in the county of DeWitt and State of Illinois, have invented a new and Improved Sorghum-Evaporator; and I do hereby declare that the following is a full, clear, and exact description thereof, which will enable others skilled in the art to make and use the same, reference being had to the accompanying drawings, forming a part of this specification, in which—

Figure 1 represents a plan view of my improvement; Fig. 2, a side sectional elevation of the same; Fig. 3, an end sectional elevation of a skimmer and compartment.

Similar letters of reference indicate like parts.

The object of this improvement is to facilitate the skimming of saccharine juices during the process of boiling.

A is an inclined bottom, arranged over a suitable furnace, B, provided at one end with doors and grate for the reception of fuel, and with a chimney at the other end to carry off the products of combustion. The furnace or heating apparatus may be constructed in the manner shown or in any other suitable manner.

Upon the bottom A, I form or erect a series of partitions, C, and sides C', so as to form a series of separate juice boxes or receptacles, F, arranged in step form—one higher than the other. Said receptacles have at each end an additional partition, $a$, to exclude the juice from the corners of the receptacles. The receptacles F are so arranged that the overflowing contents of one receptacle will pass down into the receptacle next below.

In order to effect the skimming of the juice, I arrange a perforated shelf or skimmer, D, along the front upper edge of each compartment, so that the juice as it overflows from one compartment will pass through the skimmer D. The latter, it will be observed, is higher at its center than at its ends, so that the skimmed refuse will pass down the skimmer toward the ends thereof and fall into the gutters E upon the sides of the apparatus. Suitable receptacles are to be placed under the gutters to receive the drippings therefrom. The skimmers D have their front edges turned up a little, as shown at $c$, to prevent any of the juice from passing the edges without being strained.

Fire having been placed in the furnace, the bottom of the evaporator becomes heated. The fresh juice is introduced into the upper or highest compartment, F, and from thence overflows into the compartment next below, and so on until all the compartments are filled, the clarified and reduced juice being finished in the lowest compartment of all. The various compartments are provided with orifices and plugs $b'$, for drawing off their contents when desired.

My improvement is a self-skimming evaporator, and results in the saving of all the labor heretofore required for skimming.

Having thus described my invention, I claim as new and desire to secure by Letters Patent—

1. A self-skimming evaporator constructed and operating substantially in the manner herein shown and described.

2. The combination of a skimmer, D, with a juice receptacle or compartment, F, substantially in the manner herein shown and described.

3. The inclined arrangement of the skimmers so that their refuse drippings will be conducted away from the evaporator.

4. The combination of the gutters E with the skimmers D, as and for the purpose herein shown and described.

LEVI WRIGHT.

Witnesses:
A. H. CRAVEN,
W. R. CARLE.